US012424768B2

(12) United States Patent
Lin et al.

(10) Patent No.: US 12,424,768 B2
(45) Date of Patent: Sep. 23, 2025

(54) ANTENNA DEVICE

(71) Applicants: INVENTEC (PUDONG) TECHNOLOGY CORPORATION, Shanghai (CN); INVENTEC CORPORATION, Taipei (TW)

(72) Inventors: Hsin-Hung Lin, Taipei (TW); Yu Shu Tai, Taipei (TW); Wei-Chen Cheng, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 275 days.

(21) Appl. No.: 18/205,523

(22) Filed: Jun. 3, 2023

(65) Prior Publication Data

US 2024/0313420 A1 Sep. 19, 2024

(30) Foreign Application Priority Data

Mar. 13, 2023 (CN) ......................... 202310239270.7

(51) Int. Cl.
*H01Q 1/38* (2006.01)
*H01Q 9/04* (2006.01)
*H01Q 21/06* (2006.01)

(52) U.S. Cl.
CPC ......... *H01Q 21/065* (2013.01); *H01Q 9/0407* (2013.01)

(58) Field of Classification Search
CPC ............ H01Q 1/36; H01Q 1/38; H01Q 21/06; H01Q 21/065; H01Q 9/04; H01Q 9/0407
See application file for complete search history.

(56) References Cited

U.S. PATENT DOCUMENTS

| | | | | |
|---|---|---|---|---|
| 6,018,319 | A * | 1/2000 | Lindmark | H01Q 13/106 343/770 |
| 7,423,595 | B2 * | 9/2008 | Saily | H01Q 9/0457 343/846 |
| 7,471,248 | B2 * | 12/2008 | Popugaev | H01Q 9/0428 343/700 MS |
| 8,890,750 | B2 * | 11/2014 | Mak | H01Q 21/08 343/770 |
| 10,270,174 | B2 * | 4/2019 | Paulotto | H01Q 9/0407 |
| 11,145,983 | B1 * | 10/2021 | Tarng | H01Q 13/18 |
| 12,021,308 | B2 * | 6/2024 | Park | H01Q 5/40 |

* cited by examiner

*Primary Examiner* — Tho G Phan
(74) *Attorney, Agent, or Firm* — Maschoff Brennan

(57) ABSTRACT

An antenna device includes a first substrate, a second substrate, a radiation portion and a cross-shaped exciter. The first substrate has a first top surface. The first substrate is stacked on the second substrate. The second substrate has a second top surface and a bottom surface. The second top surface faces away from the bottom surface. The radiation portion is disposed on the first top surface, and includes a first radiation component, a second radiation component, a third radiation component and a fourth radiation component. The first radiation component and the fourth radiation component are arranged on the first top surface symmetrically along a diagonal of the first top surface. The second radiation component and the third radiation component are arranged on the first top surface symmetrically along another diagonal of the first top surface. The cross-shaped exciter is disposed on the top surface.

9 Claims, 8 Drawing Sheets

ANTENNA DEVICE

CROSS-REFERENCE TO RELATED APPLICATIONS

This non-provisional application claims priority under 35 U.S.C. § 119(a) on Patent Application No(s). 202310239270.7 filed in China, on Mar. 13, 2023, the entire contents of which are hereby incorporated by reference.

BACKGROUND OF THE INVENTION

Technical Field of the Invention

The invention relates to an antenna device, more particularly to an antenna device having a radiation portion.

Description of the Related Art

With the advancement of wireless communication technology, electronic devices such as mobile phones and personal digital assistants have more diversified functions and enhanced performance, and become lighter and thinner. In particular, the wireless communication technology will enter the 6G era in 2030 and satisfy various requirements for life applications and business that 5G cannot meet.

Generally, manufacturers need to design an antenna device in accordance with the frequency band applicable to the electronic product. However, the frequency bands applicable to different electronic products are different, so that manufacturers need to design antenna devices in a different manner for different electronic products, thereby wasting time and increasing manufacturing cost. Therefore, how to simplify the design process of the antenna device and allow the antenna device to be shared among different electronic products for different frequency bands is an important issue to be solved.

SUMMARY OF THE INVENTION

The invention provides an antenna device that can be shared among different electronic products for different frequency bands One embodiment of the invention provides an antenna device including a first substrate, a second substrate, a radiation portion and a cross-shaped exciter. The first substrate has a first top surface. The first substrate is stacked on the second substrate. The second substrate has a second top surface and a bottom surface. The second top surface faces away from the bottom surface. The radiation portion is disposed on the first top surface, and includes a first radiation component, a second radiation component, a third radiation component and a fourth radiation component. The first radiation component and the fourth radiation component are arranged on the first top surface symmetrically along a diagonal of the first top surface. The second radiation component and the third radiation component are arranged on the first top surface symmetrically along another diagonal of the first top surface. The cross-shaped exciter is disposed on the top surface, and is at least partially located within a coverage of the radiation portion.

According to the antenna device disclosed by above embodiments, the first substrate on which the radiation portion is disposed is stacked on the second substrate on which the cross-shaped exciter is disposed, and the radiation portion includes the first radiation component, the second radiation component, the third radiation component and the fourth radiation component arranged symmetrically along the diagonals of the first top surface of the first substrate, respectively. Therefore, the antenna device 10 is allowed to be shared among electronic products for different frequency bands. That is, the antenna device 10 is not required to be redesigned a plurality of times for different electronic products. Thus, the design process of the antenna device 10 can be simplified, and the manufacturing cost can be reduced.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION

Figure 1:
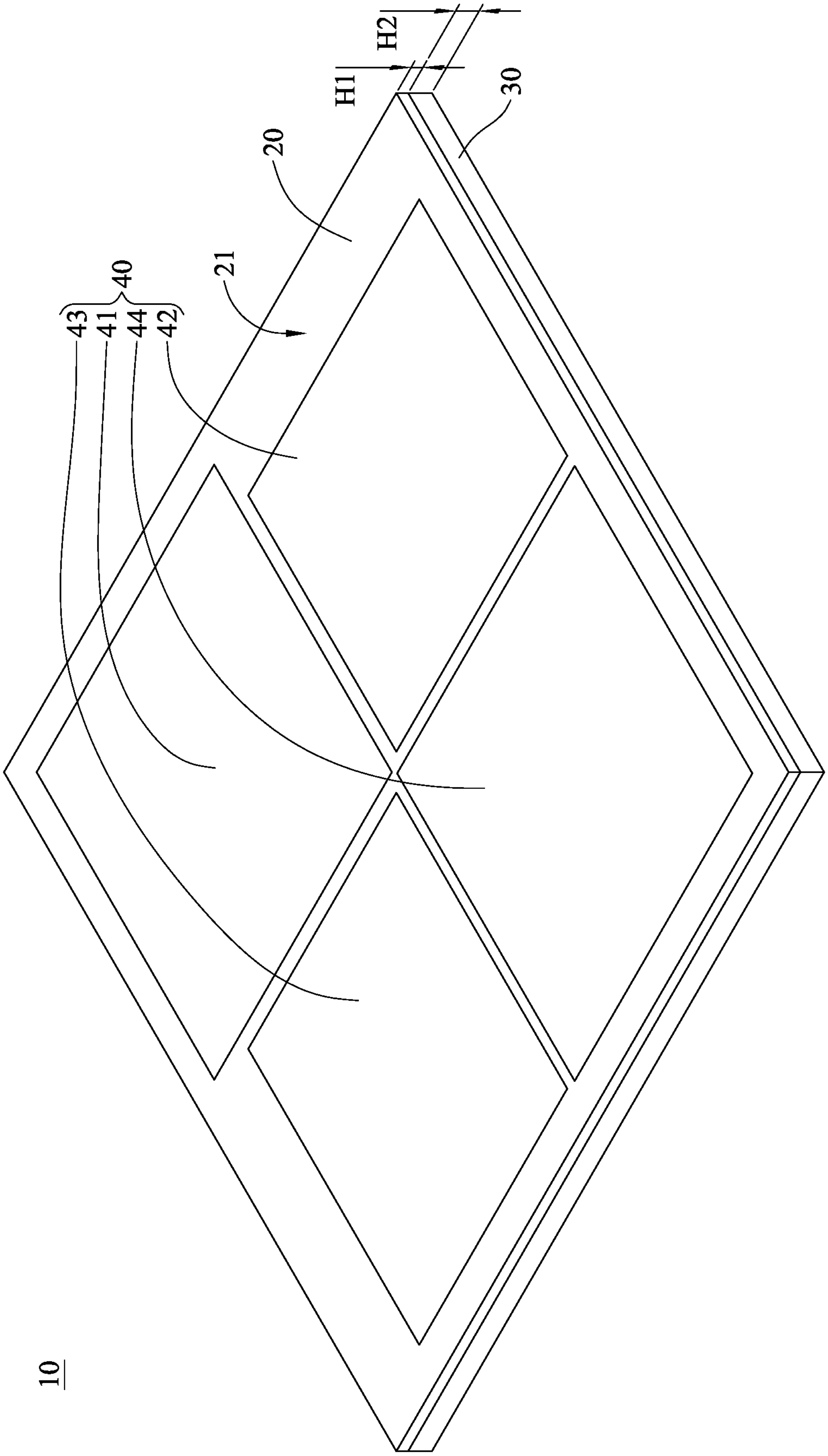
FIG. 1 is a perspective view of an antenna device in accordance with a first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Figure 2:
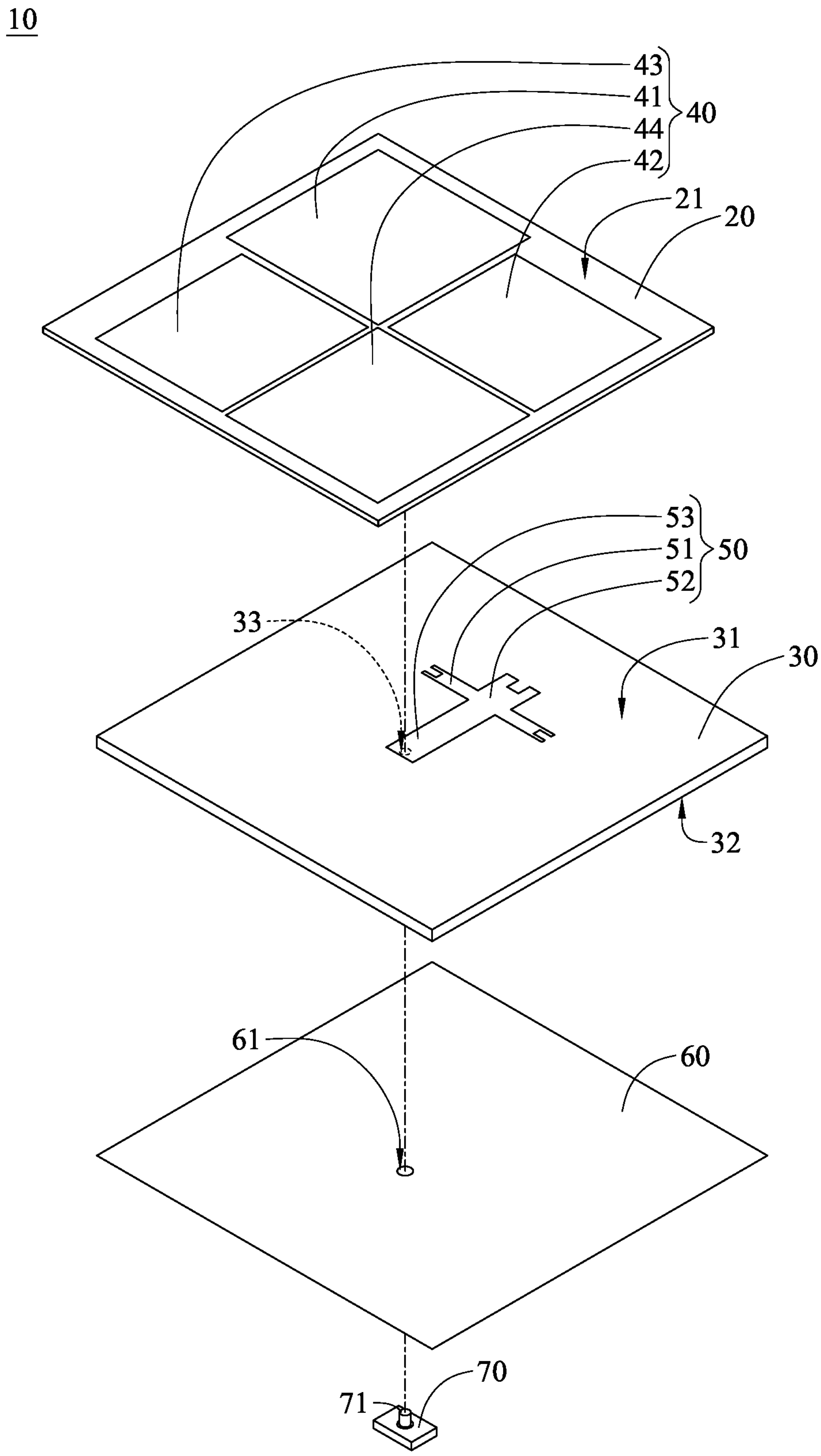
FIG. 2 is an exploded view of the antenna device in FIG. 1.

Please refer to FIG. 1 and FIG. 2, where FIG. 1 is a perspective view of an antenna device 10 in accordance with a first embodiment of the invention, and FIG. 2 is an exploded view of the antenna device 10 in FIG. 1.

In this embodiment, the antenna device 10 includes a first substrate 20, a second substrate 30, a radiation portion 40 and a cross-shaped exciter 50. The first substrate 20 and the second substrate 30 are made of, for example, a glass fiber material. The first substrate 20 has a first top surface 21, and is stacked on the second substrate 30. The second substrate 30 has a second top surface 31 and a bottom surface 32. The second top surface 31 faces away from the bottom surface 32. The radiation portion 40 is disposed on the first top surface 21. The radiation portion 40 is made of, for example, a metal material such as copper foil. The radiation portion 40 includes a first radiation component 41, a second radiation component 42, a third radiation component 43 and a fourth radiation component 44. The first radiation component 41, the second radiation component 42, the third radiation component 43 and the fourth radiation component 44 are in, for example, a rectangular shape. In addition, the first top surface 21 is in, for example, a rectangular shape. The first radiation component 41 and the fourth radiation component 44 are arranged on the first top surface 21 symmetrically along a diagonal of the first top surface 21. The second radiation component 42 and the third radiation component 43 are on the first top surface 21 arranged symmetrically along another diagonal of the first top surface 21.

In this embodiment, since the first substrate 20 is stacked on the second substrate 30, and the first radiation component 41, the second radiation component 42, the third radiation component 43 and the fourth radiation component 44 are arranged symmetrically along the diagonals of the first top surface 21 of the first substrate 20, the overall volume is reduced. Thus, the space for mounting the antenna device 10 is less restricted. Therefore, the antenna device 10 is allowed to be shared among electronic products for different frequency bands. That is, the antenna device 10 is not required to be redesigned a plurality of times for different electronic products. Thus, the design process of the antenna device 10 can be simplified, and the manufacturing cost can be reduced.

In this embodiment, a length L1 and a width W1 of each of the first substrate 20 and the second substrate 30 are, for example, 53 millimeters (mm). A thickness H1 of the first substrate 20 is, for example, 0.8 mm. A thickness H2 of the second substrate 30 is, for example, 1.6 mm.

Figure 3:
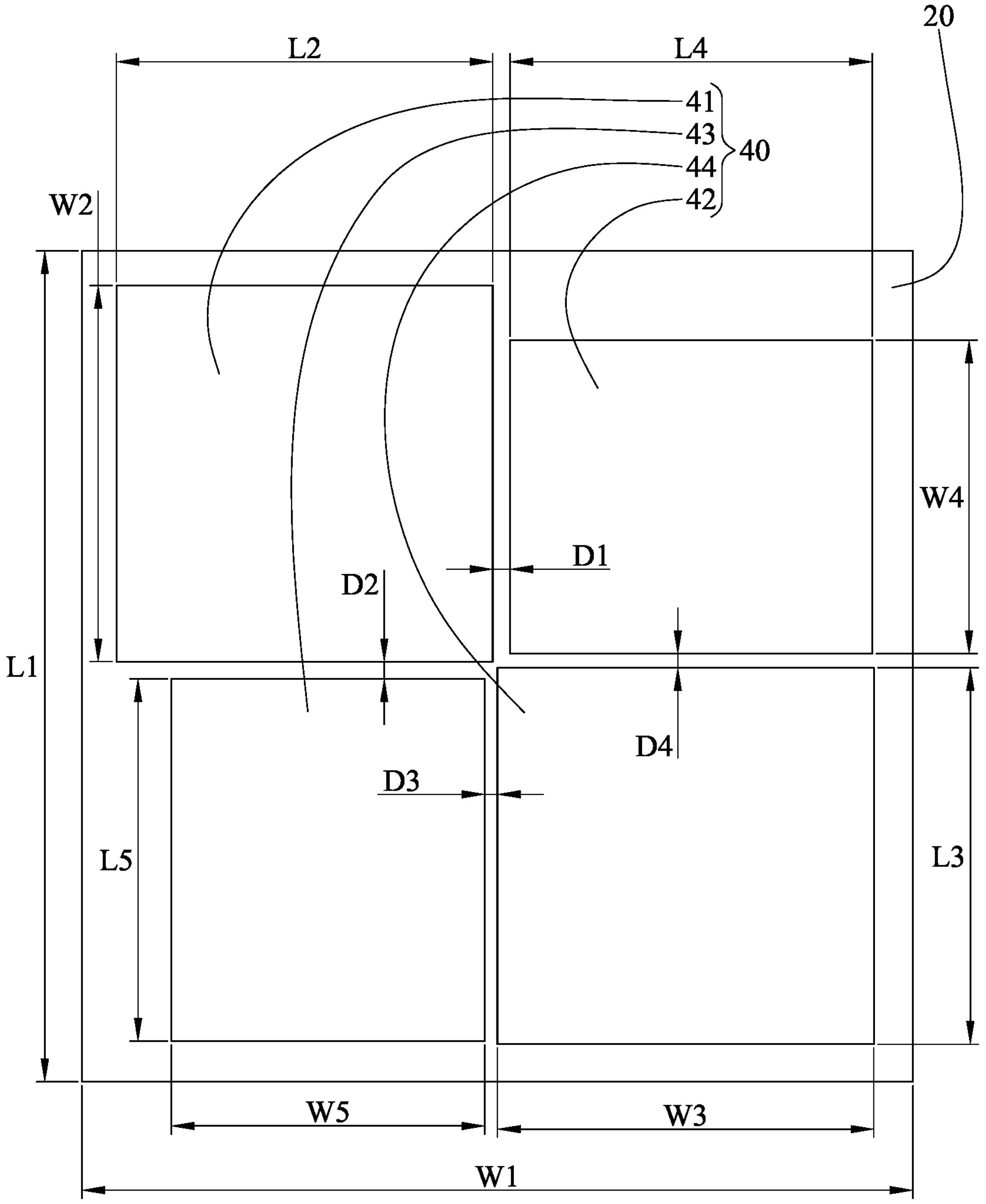
FIG. 3 is a plane view of a first substrate and a radiation portion of the antenna device in FIG. 1.

Please refer to FIG. 1 to FIG. 3, where FIG. 3 is a plane view of a first substrate and a radiation portion of the antenna device in FIG. 1. The first radiation component 41 and the second radiation component 42 are spaced apart from each other by a first distance D1. The first radiation component 41 and the third radiation component 43 are spaced apart from each other by a second distance D2. The third radiation component 43 and the fourth radiation component 44 are spaced apart from each other by a third distance D3. The second radiation component 42 and the fourth radiation component 44 are spaced apart from each other by a fourth distance D4. The first distance D1 is the same as the second distance D2. The first distance D1, the third distance D3 and the fourth distance D4 are different from one another.

In this embodiment, the first radiation component 41 and the fourth radiation component 44 and the second radiation component 42 and the third radiation component 43 are arranged symmetrically along the diagonals of the first top surface 21, respectively. Thus, the first distance D1 is the same as the second distance D2, and the first distance D1, the third distance D3 and the fourth distance D4 are different from one another. In this way, not only the antenna device 10 can support the n78 frequency band ranging from 3.3 GHz to 3.8 GHz and the n79 frequency band ranging from 4.4 GHz to 5 GHz in the 5G frequency band or the WIFI-6E frequency band ranging from 5.925 GHz to 7.125 GHZ, but also the signal interference between the first to fourth radiation components 41, 42, 43, 44 and the return loss can be reduced when the first to fourth radiation components 41, 42, 43, 44 transfer signals.

In this embodiment, a length L2 and a width W2 of the first radiation component 41 are, for example, 24 mm. A length L3 and a width W3 of the second radiation component 42 are, for example, 24 mm. A length L4 of the second radiation component 42 is, for example, 23.1 mm. A length L5 of the third radiation component 43 is, for example, 23.1 mm. A width W4 of the second radiation component 42 is, for example, 20 mm. A width W5 of the third radiation component 43 is, for example, 20 mm. The first distance D1 and the second distance D2 are, for example, 1.1 mm. The third distance D3 is, for example, 0.8 mm. The fourth distance D4 is, for example, 0.9 mm.

Figure 4:
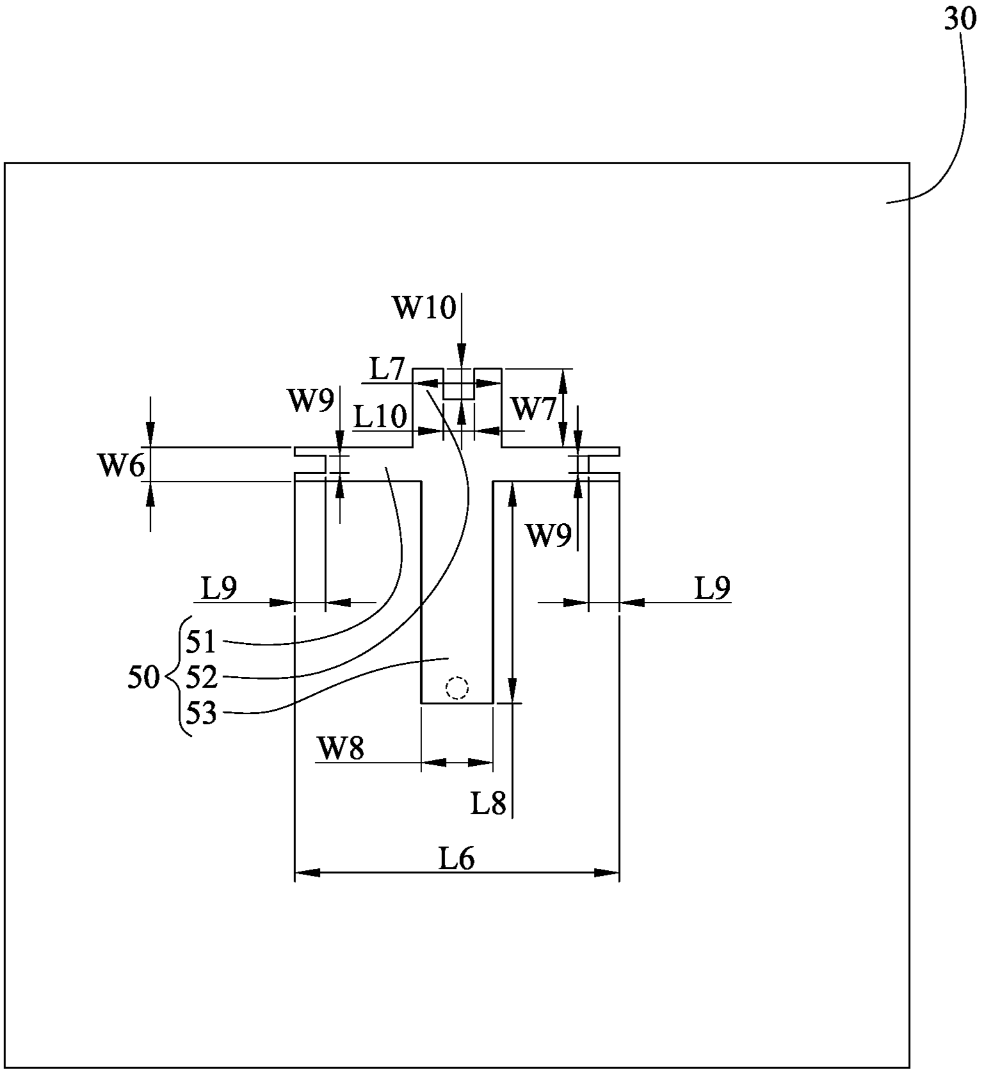
FIG. 4 is a plane view of a second substrate and a cross-shaped exciter of the antenna device in FIG. 1.
Figure 5:
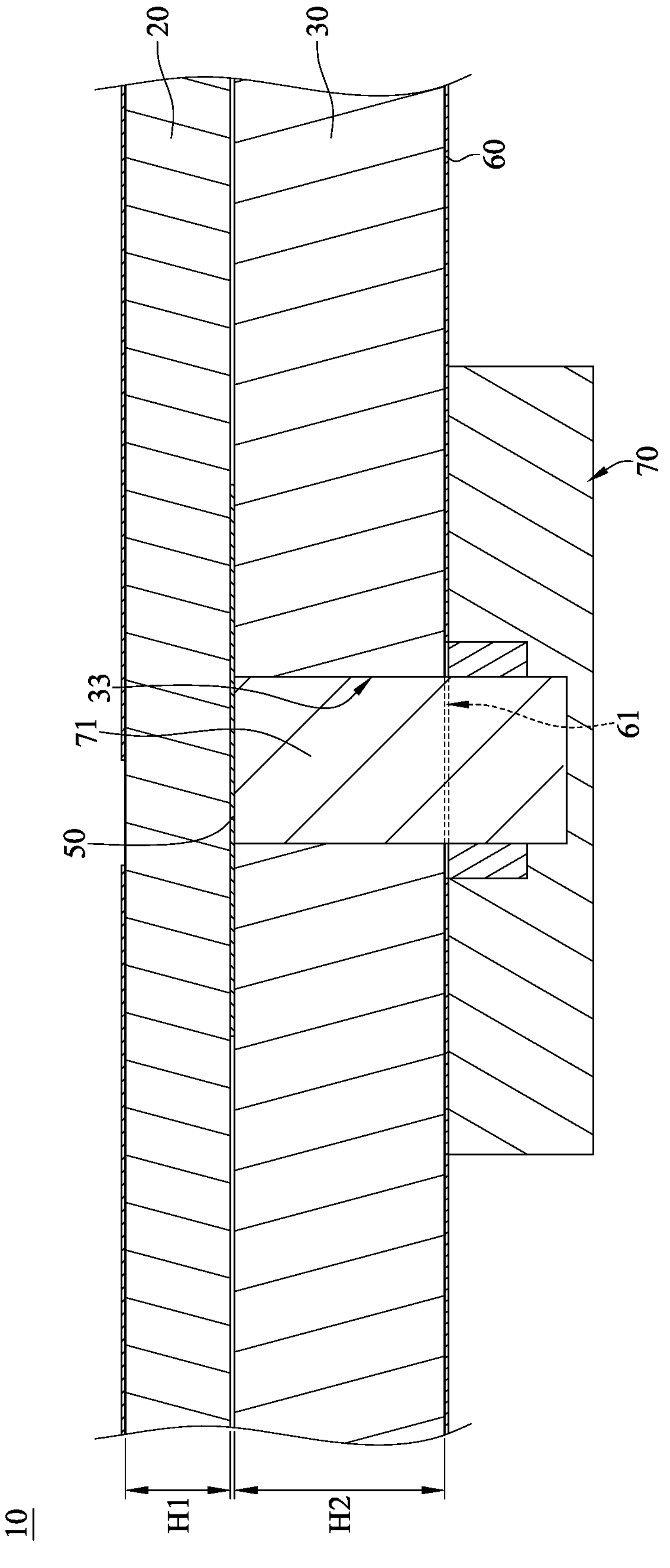
FIG. 5 is a cross-sectional view of the antenna device in FIG. 1.

Please refer to FIG. 1 to FIG. 5, where FIG. 4 is a plane view of a second substrate and a cross-shaped exciter of the antenna device in FIG. 1, and FIG. 5 is a cross-sectional view of the antenna device in FIG. 1.

The cross-shaped exciter 50 is disposed on the second top surface 31. 50 is at least partially located within a coverage of the radiation portion 40. That is, the first substrate 20 is located between the radiation portion 40 and the cross-shaped exciter 50. The cross-shaped exciter 50 is made of, for example, metal material such as copper foil. The cross-shaped exciter 50 includes a lateral exciter portion 51, a first longitudinal exciter portion 52 and a second longitudinal exciter portion 53. One end of the first longitudinal exciter portion 52 and one end of the second longitudinal exciter portion 53 are connected to two opposite sides of a central portion of the lateral exciter portion 51, respectively. Each of two opposite ends of the lateral exciter portion 51 and another end of the first longitudinal exciter portion 52 has a recess, respectively. With such recess, the frequency bandwidth of the low frequency band for the antenna device 10 of the present invention is widen and the return loss is reduced.

In this embodiment, a length L6 of the lateral exciter portion 51 is, for example, 19 mm. A width W6 of the lateral exciter portion 51 is, for example, 2 mm. A length L7 of the first longitudinal exciter portion 52 is, for example, 5.2 mm. A width W7 of the first longitudinal exciter portion 52 is, for example, 4.6 mm. A length L8 of the second longitudinal exciter portion 53 is, for example, 13 mm. A width W8 of the second longitudinal exciter portion 53 is, for example, 4.2 mm. A length L9 of the two recesses of the lateral exciter portion 51 are, for example, 1.8 mm. A width W9 of the two recesses of the lateral exciter portion 51 are, for example, 1 mm. A length L10 and a width W10 of the recess of the first longitudinal exciter portion 52 are, for example, 1.8 mm.

In this embodiment, the antenna device 10 further includes a ground structure 60 and a feeding structure 70. The ground structure 60 is disposed on the bottom surface 32 of the second substrate 30. The ground structure 60 is made of, for example, a metal material such as copper foil. The feeding structure 70 includes a protrusion portion 71. The ground structure 60 has a first through hole 61. The second substrate 30 has a second through hole 33. The protrusion portion 71 of the feeding structure 70 passes through the first through hole 61 of the ground structure 60 and the second through hole 33 of the second substrate 30. The cross-shaped exciter 50 covers the second through hole 33. When a signal is fed into the feeding structure 70 and transferred to the cross-shaped exciter 50 on the second substrate 30 to be excited, it can be radiated outward from the radiation portion 40 on the first substrate 20.

Figure 6:
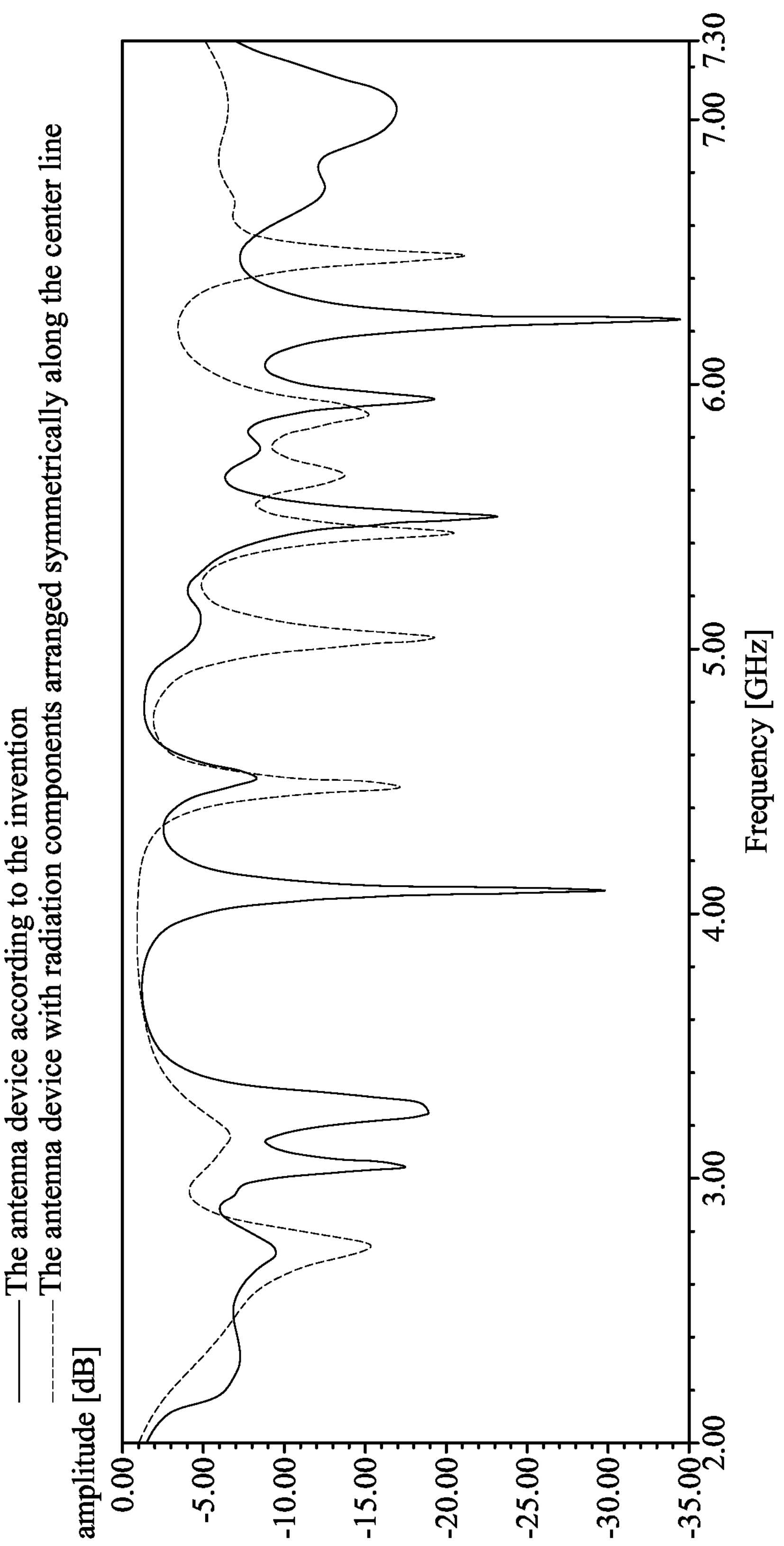
FIG. 6 is a graph showing return loss data among different antenna devices.

Please refer to FIG. 6, which is a graph showing return loss data among different antenna devices. As shown in FIG. 6, compared with the antenna device of a comparative example where the first radiation component and the third radiation component and the second radiation component and the fourth radiation component arranged symmetrically along a center line on the first top surface, in the low frequency band, the antenna device 10 of the present invention has a wider frequency bandwidth. In the frequency band ranging from 5.8 gigahertz (GHz) to 6.6 GHz, the return loss of the antenna device 10 of the present invention is lower than −6 dB (amplitude) or even lower than −10 dB. On the contrary, in the low frequency band, the frequency bandwidth of the antenna device of the comparative example is narrower. In addition, in the partial frequency band ranging from 5.8 gigahertz (GHz) to 6.6 GHz, the return loss is higher than −6 dB. That is, with the first radiation component 41 and the third radiation component 43 and the second radiation component 42 and the fourth radiation component 44 on the first top surface 21 arranged symmetrically along diagonals of the first top surface 21, respectively, the frequency bandwidth of the low frequency band for the antenna device 10 of the present invention is widen and the return loss is reduced.

Figure 7:
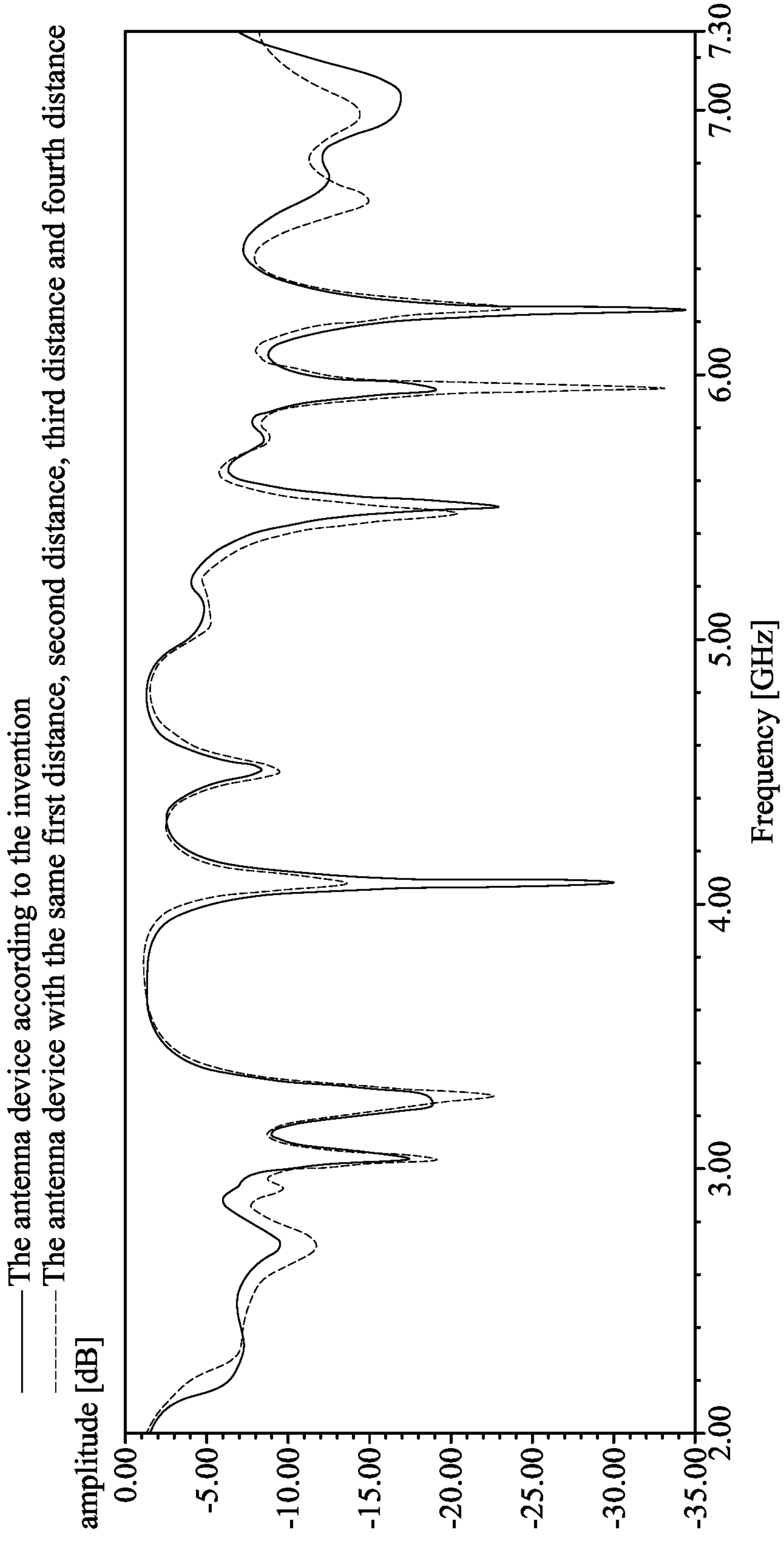
FIG. 7 is another graph showing return loss data among different antenna devices.

Please refer to FIG. 7, which is another graph showing return loss data among different antenna devices. As shown in FIG. 7, compared with the antenna device of a comparative example where the first distance D1, the second distance D2, the third distance D3 and the fourth distance D4 are the same, in the low frequency band, the antenna device 10 of the present invention has a wider frequency bandwidth. In the frequency band ranging from 5.6 GHz to 5.7 GHZ, the return loss of the antenna device 10 of the present invention is lower than −6 dB. On the contrary, in the low frequency band, the frequency bandwidth of the antenna device of the comparative example is narrower. In addition, in the partial frequency band ranging from 5.6 gigahertz (GHz) to 5.7 GHZ, the return loss is higher than −6 dB. That is, with the first distance D1 and the second distance D2 being the same and the first distance D1, the third distance D3 and the fourth distance D4 being different, the frequency bandwidth of the low frequency band for the antenna device 10 of the present invention is widen and the return loss is reduced.

Figure 8:
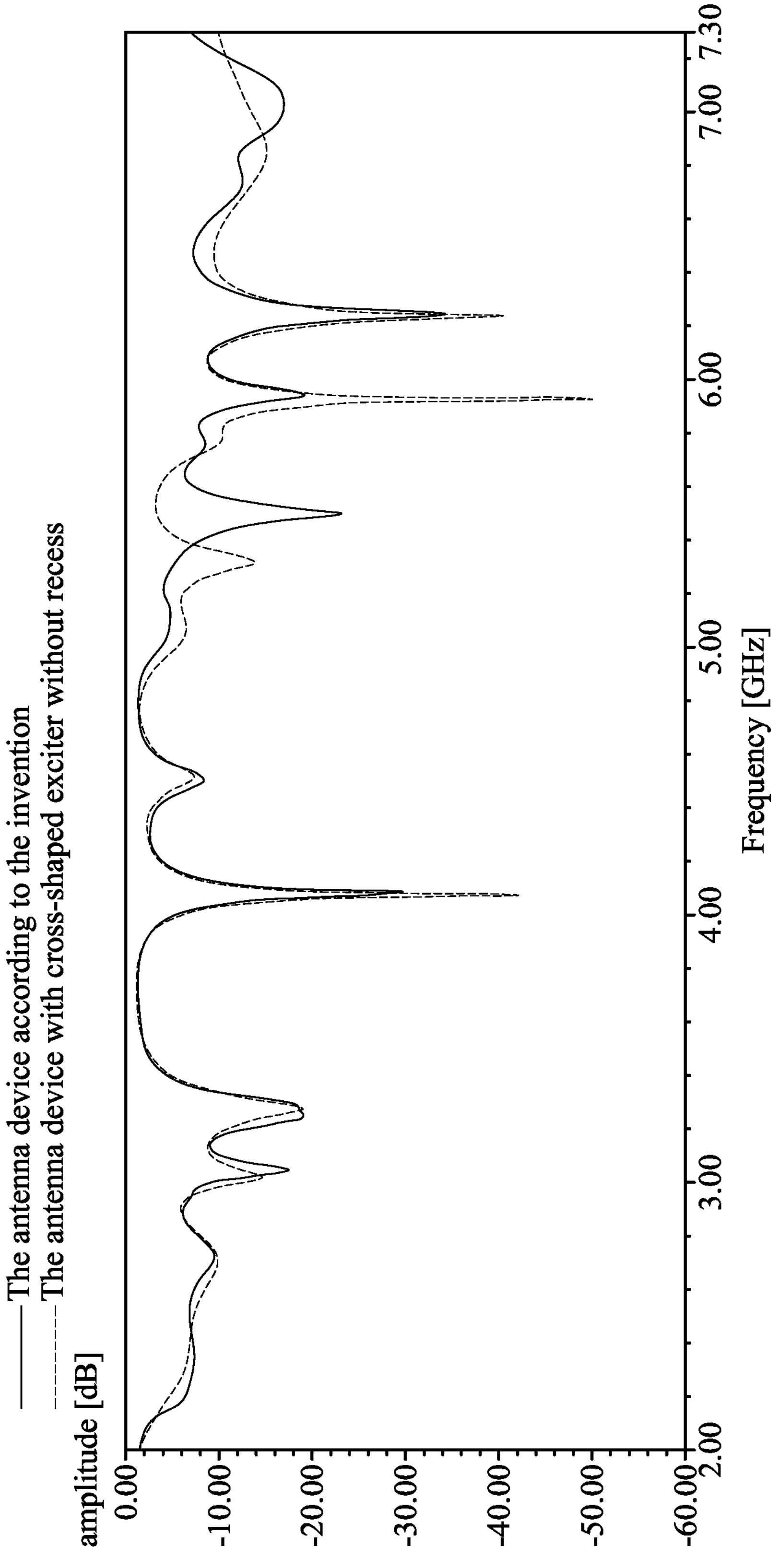
FIG. 8 is another graph showing reflection loss data among different antenna devices.

Please refer to FIG. 8, which is another graph showing reflection loss data among different antenna devices. As shown in FIG. 8, compared with the antenna device of a comparative example with the cross-shaped exciter 50 without recesses, in the low frequency band, the antenna device 10 of the present invention has a wider frequency bandwidth. In a few frequency band ranging from 5.4 GHz to 5.6 GHZ, the return loss of the antenna device 10 of the present invention is higher than −6 dB. In the rest of the aforementioned frequency band, the reflection is lower than −6 dB or even lower than −10 dB. On the contrary, in the low frequency band, the frequency bandwidth of the antenna device of the antenna device of the comparative example is narrower. In addition, in the partial frequency band ranging from 5.4 GHz to 5.6 GHz, the return loss is higher than −6 dB. That is, with the antenna device 10 with the cross-shaped exciter 50 with recesses, the frequency bandwidth of the low frequency band for the antenna device 10 of the present invention is widen and the return loss is reduced.

According to the antenna device disclosed by above embodiments, the first substrate on which the radiation portion is disposed is stacked on the second substrate on which the cross-shaped exciter is disposed, and the radiation portion includes the first radiation component, the second radiation component, the third radiation component and the fourth radiation component arranged symmetrically along the diagonals of the first top surface of the first substrate, respectively. Therefore, the antenna device 10 is allowed to be shared among electronic products for different frequency bands. That is, the antenna device 10 is not required to be redesigned a plurality of times for different electronic products. Thus, the design process of the antenna device 10 can be simplified, and the manufacturing cost can be reduced.

It will be apparent to those skilled in the art that various modifications and variations can be made to the present invention. It is intended that the specification and examples be considered as exemplary embodiments only, with the scope of the invention being indicated by the following claims and their equivalents.

What is claimed is:

1. An antenna device, comprising:

a first substrate, having a first top surface;

a second substrate, wherein the first substrate is stacked on the second substrate, the second substrate has a second top surface and a bottom surface, and the second top surface faces away from the bottom surface;

a radiation portion, disposed on the first top surface, and comprising a first radiation component, a second radiation component, a third radiation component and a fourth radiation component, wherein the first radiation component and the fourth radiation component are arranged on the first top surface symmetrically along a diagonal of the first top surface, and the second radiation component and the third radiation component are arranged on the first top surface symmetrically along another diagonal of the first top surface; and a cross-shaped exciter, disposed on the second top surface, and being at least partially located within a coverage of the radiation portion, wherein the cross-shaped exciter comprises a lateral exciter portion, a first longitudinal exciter portion and a second longitudinal exciter portion, one end of the first longitudinal exciter portion and one end of the second longitudinal exciter portion are connected to two opposite sides of a central portion of the lateral exciter portion, respectively, and each of two opposite ends of the lateral exciter portion and another end of the first longitudinal exciter portion has a recess, respectively.

2. The antenna device according to claim 1, wherein the first radiation component and the second radiation component are spaced apart from each other by a first distance, the first radiation component and the third radiation component are spaced apart from each other by a second distance, the third radiation component and the fourth radiation component are spaced apart from each other by a third distance, the second radiation component and the fourth radiation component are spaced apart from each other by a third distance, the second radiation component and the fourth radiation component are spaced apart from each other by a fourth distance, the first distance is the same as the second distance, and the first distance, the third distance and the fourth distance are different from one another.

3. The antenna device according to claim 2, wherein a length and a width of the first radiation component are 24 millimeters, a length and a width of the second radiation component are 24 millimeters, a length of the second radiation component is 23.1 millimeters, a length of the third radiation component is 23.1 millimeters, a width of the second radiation component is 20 millimeters, a width of the third radiation component is 20 millimeters, the first distance and the second distance are 1.1 millimeters, the third distance is 0.8 millimeters, and the fourth distance is 0.9 millimeters.

4. The antenna device according to claim 1, wherein a length of the lateral exciter portion is 19 millimeters, a width of the lateral exciter portion is 2 millimeters, a length of the first longitudinal exciter portion is 5.2 millimeters, a width of the first longitudinal exciter portion is 4.6 millimeters, a length of the second longitudinal exciter portion is 13 millimeters, a width of the second longitudinal exciter portion is 4.2 millimeters, a length of the each of the two recesses of the lateral exciter portion is 1.8 millimeters, a width of each of the two recesses of the lateral exciter portion is 1 millimeter, a length of the recess of the first longitudinal exciter portion is 1.8 millimeters, and a width of the recess of the first longitudinal exciter portion is 1.8 millimeters.

5. The antenna device according to claim 1, further comprising a ground structure, wherein the ground structure is disposed on the bottom surface of the second substrate.

6. The antenna device according to claim 5, further comprising a feeding structure, wherein the feeding structure comprises a protrusion portion, the ground structure has a first through hole, the second substrate has a second through hole, the protrusion portion of the feeding structure passes through the first through hole of the ground structure and the second through hole of the second substrate, and the cross-shaped exciter covers the second through hole.

7. The antenna device according to claim 1, wherein a length and a width of the first substrate are 53 millimeters, a length and a width of the second substrate are 53 millimeters, a thickness of the first substrate is 0.8 millimeters, and a thickness of the second substrate is 1.6 millimeters.

8. The antenna device according to claim 1, wherein each of the first substrate and the second substrate are made of a glass fiber material.

9. The antenna device according to claim 1, wherein each of the radiation portion and the cross-shaped exciter are made of a metal material.

* * * * *